(12) United States Patent
Kochergin et al.

(10) Patent No.: US 10,150,060 B2
(45) Date of Patent: Dec. 11, 2018

(54) DEVICE FOR DEGASSING LIQUIDS

(71) Applicants: Vadim Kochergin, Eagle, ID (US);
Santiago Grimaldo, Baton Rouge, LA (US)

(72) Inventors: Vadim Kochergin, Eagle, ID (US);
Santiago Grimaldo, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 701 days.

(21) Appl. No.: 14/405,799

(22) PCT Filed: May 22, 2013

(86) PCT No.: PCT/US2013/042137
§ 371 (c)(1),
(2) Date: Dec. 5, 2014

(87) PCT Pub. No.: WO2013/188066
PCT Pub. Date: Dec. 19, 2013

(65) Prior Publication Data
US 2015/0174507 A1    Jun. 25, 2015

Related U.S. Application Data

(60) Provisional application No. 61/659,078, filed on Jun. 13, 2012.

(51) Int. Cl.
*B01D 19/00* (2006.01)
*C02F 1/20* (2006.01)
(Continued)

(52) U.S. Cl.
CPC ..... *B01D 19/0036* (2013.01); *B01D 19/0021* (2013.01); *B01D 21/2416* (2013.01);
(Continued)

(58) Field of Classification Search
CPC . B01D 19/00–19/0495; B01D 21/2416; B01D 21/2427; B01D 21/2494; B01D 21/24–21/2488; C02F 1/20; C13B 20/16
(Continued)

(56) References Cited

U.S. PATENT DOCUMENTS 4,986,837 A    1/1991  Shibata ........................... 55/190
5,232,475 A *  8/1993  Jepson ............... B01D 19/0031
                                                   166/267

(Continued)

FOREIGN PATENT DOCUMENTS

CN         101830594       10/2011
WO    WO / 2010/091461      8/2010

OTHER PUBLICATIONS

Rein, P., "Cane Sugar Engineering," Bartens, Berlin, 1st ed., Sec. 9.6, pp. 213-216 (2007).

*Primary Examiner* — T. Bennett McKenzie
(74) *Attorney, Agent, or Firm* — John H. Runnels

(57) ABSTRACT

A degassing chamber is disclosed, adapted for the efficient removal of entrained gases from liquids. In a preferred embodiment the degassing chamber is combined with and works in conjunction with a sedimentation tank to provide an efficient clarification station. The combined clarification station can have a "footprint" the same size as, or only slightly larger than, the footprint of the sedimentation tank alone. The degassing chamber is well-suited for retrofitting, and can easily be combined with most types of solid-liquid sedimentation tanks that are currently used in the industry.

12 Claims, 2 Drawing Sheets

(51) Int. Cl.
  *B01D 21/24* (2006.01)
  *C13B 20/16* (2011.01)
(52) U.S. Cl.
  CPC ..... *B01D 21/2427* (2013.01); *B01D 21/2494* (2013.01); *C02F 1/20* (2013.01); *C13B 20/16* (2013.01)
(58) Field of Classification Search
  USPC .......................................... 96/197; 127/53–57
  See application file for complete search history.

(56) References Cited

U.S. PATENT DOCUMENTS

| | | | | |
|---|---|---|---|---|
| 5,928,519 | A | * | 7/1999 | Homan ................ B01D 17/005 175/206 |
| 6,079,372 | A | | 6/2000 | Bekedam ...................... 122/451 |
| 6,793,814 | B2 | | 9/2004 | Fout et al. .................... 210/188 |
| 2003/0221560 | A1 | * | 12/2003 | MacDuff ................ B01D 19/00 96/165 |
| 2007/0214964 | A1 | | 9/2007 | Miyashita et al. ............. 96/193 |

* cited by examiner

DEVICE FOR DEGASSING LIQUIDS

This is the United States national stage of international application PCT/US2013/042137, international filing date May 22, 2013, which claims the benefit of the Jun. 13, 2012 filing date of U.S. provisional patent application Ser. No. 61/659,078 under 35 U.S.C. § 119(e).

TECHNICAL FIELD

This invention pertains to an apparatus for degassing liquids.

BACKGROUND ART

Clarifiers to separate solids and liquids are extensively used in various industries, including the water treatment, pulp, paper, and sugar industries. A typical clarifier comprises a cylindrical tank with a sloped base, with or without a raking mechanism for removing sludge. The clarified liquid is typically withdrawn through overflow launders on the periphery of the cylindrical tank.

When manufacturing raw sugar, for example, an important preliminary step is to "clarify" the sugar juice. A general disadvantage of existing clarifier designs is that they generally allow large turbulent eddies inside the tanks, which causes inefficient use of the settling area, prolonged residence time, and entrainment of mud in the clarified liquid. These problems are exacerbated by recirculation and flotation promoted by entrained air. A degassing step is often used to remove entrained air from the sugar juice. If degassing is not performed properly, the quality of the clarified liquid will be poor.

In the production of cane sugar juice, a "flash tank" is often employed for degassing, by heating the juice slightly above the boiling point, removing air from the juice and also from entrapped particles, and then delivering the degassed juice to a sedimentation tank at a constant temperature.

Two types of "flash tanks" are commonly used. The "Type A" flash tank is a vessel that runs largely empty, to provide sufficient volume in the tank for the complete flashing of juice. The diameter is selected so that upward vapor velocities are low enough that entrainment of juice droplets does not occur. If the tank does not have an adequately sized outlet, air in the exit pipe can be re-entrained into the flashed juice.

The "Type B" flash tank runs with more liquid inside the tank during operation. The higher liquid level reduces air entrainment, but a Type B tank occupies more space than a Type A flash tank of comparable capacity. The tank has a diameter large enough that the downward liquid velocity is sufficiently slow to permit even very fine air bubbles to escape upwards against the flow of liquid. A vertical feed pipe injects the juice downwards onto a center splash plate. The liquid level is maintained just below the splash plate. The flash tank is positioned preferably adjacent to and at the same elevation as the clarifier so that a constant liquid level is maintained in the flash tank, and so that air is not re-entrained into the juice. If the liquid levels differ substantially, then air can be re-entrained into the juice in the connecting pipe. The Type B flash tank is not clean-draining, and it requires periodic cleaning. See generally P. Rein, *Cane Sugar Engineering*, Bartens, Berlin, 1$^{st}$ Ed. (2007), Sec. 9.6, pp. 213-216.

International patent application no. WO 2010/091461 A1 discloses an apparatus for a high pressure evaporator, a flash tank with a cylindrical body. The device contains a vapor outlet at the upper end that allows steam to be vented, and a slurry inlet/outlet port at the lower end.

U.S. Pat. No. 4,986,837 discloses a liquid degassing apparatus with one or more porous, hydrophobic tubes located inside a vacuum chamber. Each tube has an atomizer near its inlet. As liquid to be degassed enters the tube, it is atomized and gas in the liquid passes from the atomized liquid, through the porous tube, and exits the vacuum chamber. The remaining degassed liquid exits the tube through the downstream end.

U.S. Pat. No. 6,793,814 discloses an apparatus having a tank for settling particles out of a fluid, and having a conical chamber with a conical auger at the bottom of the tank. This device contains a tangential inlet that creates a fluid circulation, which exerts a centrifugal force in order to increase separation of heavy solid particles from relatively light fluid. An alternative embodiment provides for the collection of gas from the fluid by a degassing system located above the settling chamber. Free gas in the fluid will, when subjected to centrifugal forces, tend to collect at the center and move to the top of the tank along with the substantially clean fluid. The degassing system provides a controlled space from which gas can be removed.

Flashing of sugar cane juice is an important step to achieve a good clarification. However, its importance is often overlooked, and as a result the juice is often not properly de-gassed; air can be re-entrained; and there can be excessive levels of bagacillo (fine bagasse particles) in clear juice.

DISCLOSURE OF THE INVENTION

We have discovered a novel degassing chamber, adapted for the efficient removal of entrained gases from liquids. In a preferred embodiment the degassing chamber is combined with and works in conjunction with an integrated clarifier or sedimentation tank to provide an efficient clarification station. An advantage of the combined clarification station is that it can have a "footprint" the same size as, or only slightly larger than, the footprint of the clarifier tank alone. The combined clarification station, comprising the novel degassing chamber along with a sedimentation tank, can provide for the efficient degasification of a liquid, followed by the separation of clarified liquid from sediment or mud, characterized by a short total residence time, low installation cost, and low maintenance cost. The novel degassing chamber is well-suited for retrofitting; it can easily be combined with most types of solid-liquid sedimentation tanks that are currently used in the industry.

The novel degassing chamber will, in general, occupy less space than prior flash tank devices. However, it will provide greater area for degassification. The degassing chamber may be provided as a separate unit to be fitted to a sedimentation tank, or it may be provided in integral combination with a sedimentation tank. The novel degassing chamber has a generally annular shape, adapted to be supported around the outside of a sedimentation tank. The novel chamber provides a high surface-area-to-volume ratio to facilitate efficient degassing of a liquid. Alternatively, in some embodiments it may be useful for the degassing chamber to be located inside the sedimentation tank. The generally annular shape allows a high surface-area-to-volume ratio to promote flashing. A low elevation of liquid in the flash tank (~0-65 cm) above the level of the liquid in the sedimentation tank helps reduce the entrainment of gases in liquid while it is transported from the flash tank into the sedimentation tank.

In a preferred embodiment, the device is configured so that no air is re-entrained into the feed liquid as it is delivered from the degassing chamber into the sedimentation tank. An intermediate feed trough is positioned so that liquid is properly input to the sedimentation tank; the level of the feed trough may differ for different designs of sedimentation tank. In many embodiments, it will be preferred for the liquid level in the degassing chamber to be about 0-65 cm higher than that in the feed trough to inhibit re-entrainment of air after passage through the degassing chamber. It is preferred that both the degassing chamber and the sedimentation tank should have short retention times, to minimize deterioration of the sugar juice. The novel device can have a high throughput, without adversely affecting juice quality.

In one embodiment, the liquid is initially fed to the degassing chamber from a feedstock distribution box (a compartment where the pipe that brings the juice from the process is connected to the degassing trough), and into the degassing chamber. The degassing chamber is an enclosed annulus, ring, polygon, or similarly-shaped chamber that is adapted to be mounted onto and to surround the sedimentation tank. The troughs are open within the clarifier. However, the clarifier as a whole is not normally open to the atmosphere—although it will usually incorporate lids or panels that may be opened for occasional cleaning or inspection. Depending on the equipment with which it will be used, the degassing chamber may also adopt another shape, such as that of a square or rectangular trough, or even a closed pipe (with stand pipes). The degassing chamber is vented by several stand pipes located on the top surface of the degassing chamber. Optionally, the stand pipes may function as an entrainment separator; e.g., the stand pipes can be vertical or inclined to avoid droplet entrainment. Optionally the tops of the stand pipes can be connected to one another to better equilibrate the pressures in each. Degassed liquid from the degassing chamber is transferred to a feed trough. The feed trough is, for example, in the shape of a ring located concentrically inside the degassing chamber. The feed trough distributes liquid uniformly to the sedimentation tank through a series of uniformly distributed distributor boxes or feed wells, which are short pieces of pipe. By distributing the liquid uniformly to the pipes inputting to the sedimentation tank, turbulence in the sedimentation tank is further reduced. By contrast, if liquid flow into the pipes was non-uniform, then an unwanted source of turbulence could be introduced into the sedimentation tank. It is therefore preferred that the shape of the feed trough should be symmetric, to promote uniform distribution of flow into the pipes leading into the sedimentation tank.

MODES FOR PRACTICING THE INVENTION

Figure 1:
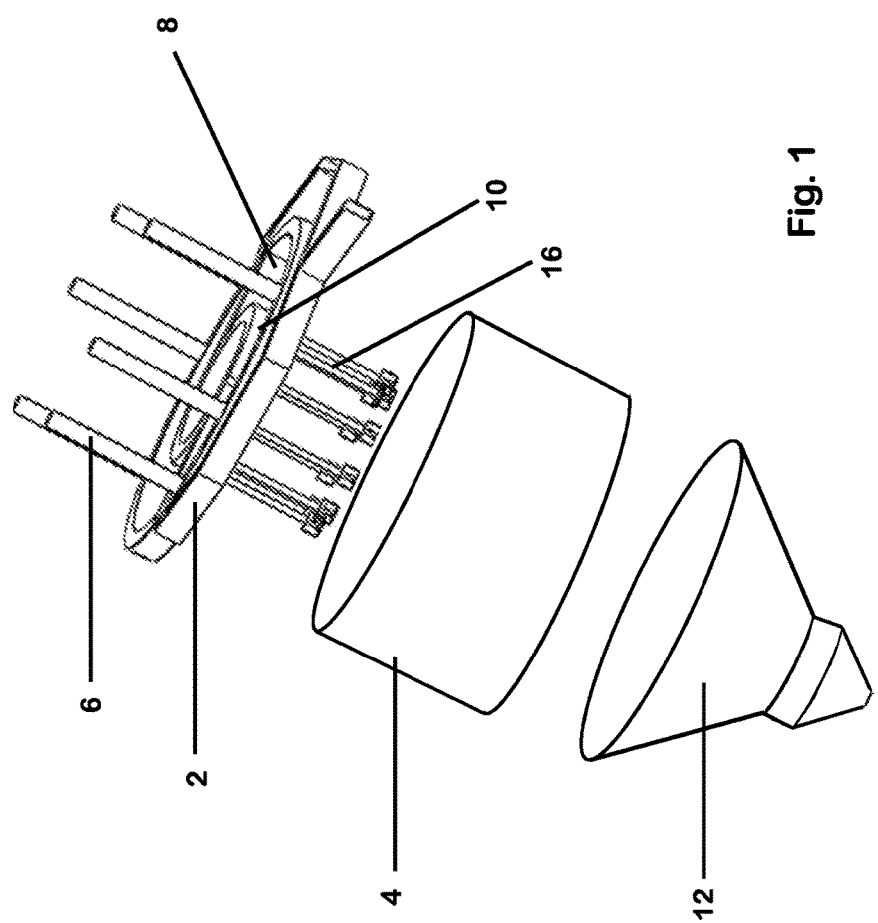
FIG. 1 depicts a top view of one embodiment of the degassing device.
Figure 2:
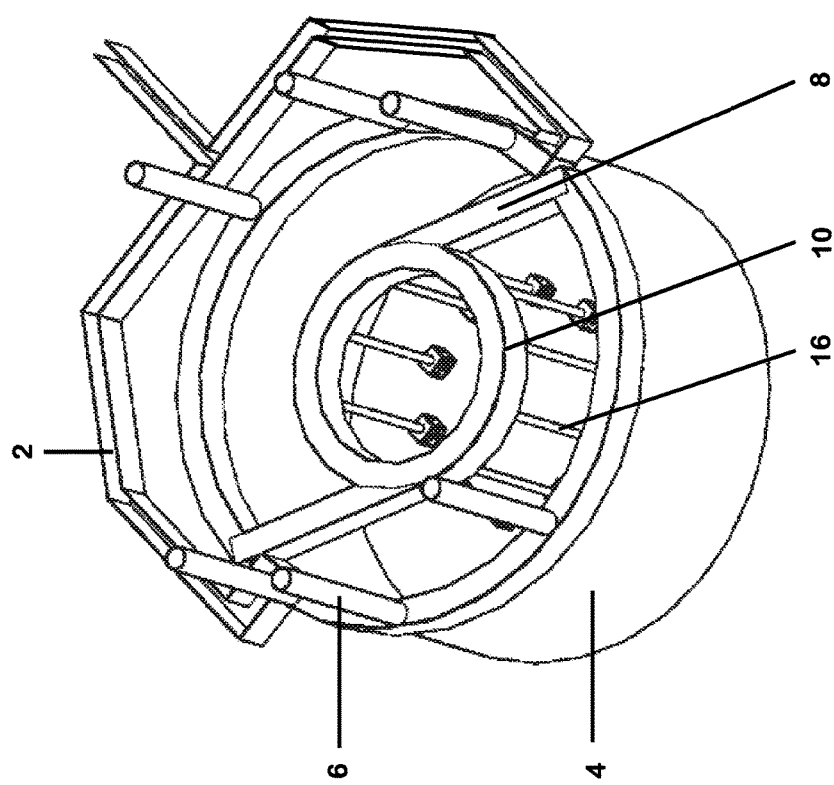
FIG. 2 depicts an exploded side view of one embodiment of the degassing device.

FIGS. 1 and 2 depict, respectively, a top view and a side view of one embodiment of the degassing device, wherein the device is mounted onto a sedimentation tank as it typically would be in use. Annular degassing chamber 2 (as well as the rest of the apparatus) is mounted onto sedimentation tank 4, and is preferably mounted concentrically on or near the top of feed trough 10. Liquid, such as sugar juice, is fed into degassing chamber 2. The juice is preferably superheated, for example to two or three degrees above the boiling point under pressure, and the juice is degassed when the pressure suddenly drops to atmospheric pressure. A high surface area also enhances degassification of the liquid. Gas is vented from degassing chamber 2 through stand pipes 6. The shape of the standpipe is preferably chosen to avoid the entrainment of droplets to minimize sugar losses in the unit, and to reduce the likelihood of injury to the operators due to sudden splashes of hot liquid. An optional connection of the tops of the stand pipes to one another helps equilibrate the pressures in each, and thus to reduce entrainment and splashing. Liquid that has been depleted of entrained gas is fed through feed trough inlet 8 into feed trough 10, which in turn feeds the liquid into sedimentation tank 4 via the feed wells 16. After the juice has been fed into sedimentation tank 4, the solids separate from the liquid by gravity, and the "mud," the separated solid phase, collects in conical mud boot 12. The mud is withdrawn from mud boot 12 either periodically or as needed.

The novel degassing chamber has a higher surface area-to-volume ratio than has typically been used in prior flash tanks, preferably between about 1.5 and about 10.0 meter$^{-1}$, more preferably between about 3.0 and about 5.0 meter$^{-1}$.

The novel degassing chamber may be provided in combination with a sedimentation tank, or it may be retrofitted or otherwise adapted for use with an existing sedimentation tank. The sedimentation tank used in conjunction with the novel degassing chamber may be any of a variety of sedimentation tanks known in the art, including Dorr clarifiers, and other clarifiers such as those disclosed in the background section of U.S. patent application Ser. No. 13/203,290.

Particularly preferred is to incorporate at the end of each feed well a turbulence reduction device such as that disclosed, depicted, and claimed in U.S. patent application Ser. No. 13/203,290. In one embodiment such a turbulence reduction device comprises: (a) first and second rigid plates, wherein said first and second plates are about the same size and shape, except that said first plate incorporates a central hole through which one of said feed wells may pass, so that said feed well is positioned to discharge liquid into the space between said first and second plates; (b) one or more spacers, wherein each said spacer is attached both to said first plate and to said second plate, wherein said spacers hold said first and second plates in a fixed position relative to one another and parallel to one another; (c) at least four baffles rigidly affixed to said second plate; wherein said baffles are positioned symmetrically relative to the axis that passes through the center of the hole in said first plate and that is also perpendicular to both said plates; and wherein spaces are present between adjacent baffles to allow some liquid to pass between adjacent baffles; wherein said turbulence reduction device is adapted for use as follows: (d) when liquid exits said feed well, the liquid impinges upon said second plate; said second plate diverts the flow of the liquid by about 90 degrees, from an approximately linear flow that is approximately parallel to the axis, into a radially outward flow that is approximately parallel to said second plate; and then, when the radially-outwardly-flowing liquid impinges upon said baffles, said baffles further disperse the energy of the flow of the liquid; so that, when the liquid exits the space between said first and second plates, there is essentially no turbulence in the liquid, and there is essentially no turbulence at the interface between the exiting liquid and the liquid already present in the sedimentation tank; and wherein the spaces between adjacent baffles inhibit the formation of any vortices that would otherwise tend to form within a hypothetical, otherwise-identical apparatus in which said adjacent baffles were contiguous to one another, without spaces between adjacent baffles.

The feed wells may be of any type known in the art. For example the feed well can incorporate a Turbulence Reduction Device (TRD) at the end of the pipe to improve the performance of the clarifier by reducing the turbulence of the juice entering the settling tank. The invention may also be used with feed wells lacking a TRD, for example a simple pipe that feeds juice into the clarifier.

In an alternative embodiment, a device in accordance with this invention may be used to remove entrained gases from a liquid as otherwise described herein, without necessarily superheating the liquid and suddenly reducing the pressure, i.e., without necessarily including a "flashing" step such as is commonly employed in the processing of sugarcane juice. For example, the device may be used in the treatment of wastewater without a superheating/flashing step. The device is still useful in removing entrained gases from the liquid, before the liquid goes into a settling tank to separate liquid from suspended solids.

Example

A prototype embodiment of the invention has been built and tested to evaluate the performance and viability of the invention when used as part of a clarifier. The prototype device was a full-scale experimental unit that was constructed as otherwise described herein, in combination with a Turbulence Reduction Device (TRD) that was generally similar to that described in U.S. patent application Ser. No. 13/203,290. For comparison, a conventional Type B flash tank was also used, and the conventional tank was fitted with an identical TRD. The two clarifiers were operated in parallel, and were used to treat mixed juice in a sugar mill. During operation samples were withdrawn to measure turbidity and color. Levels of turbidity reduction and color reduction for the two units are shown in Table 1. The results in Table 1 show that there was no significant difference between the performance of the two units. The prototype embodiment of the invention thus operated successfully in a degassing and clarification operation, while having a smaller overall footprint, in a more economical fashion, and while eliminating the need for a separate conventional flash tank.

The complete disclosures of all references cited in this application are hereby incorporated by reference. Also incorporated by reference are the complete disclosures of priority application 61/659,078, and of published international application WO 2011/037851. Also incorporated by reference are the complete disclosures of the following two presentations made by the inventors: S. Grimaldo and V. Kochergin, "Removal of Suspended Solids from Filtrate," Presentation at the Factory Operations Seminar, Audubon Sugar Institute (St. Gabriel, La., US, Apr. 11, 2013); and V. Kochergin and S. Grimaldo, "Removal of Suspended Solids from Filtrate," Presentation at the Annual Meeting of the American Society of Sugar Cane Technologists (Lafayette, La., US, Feb. 5-6, 2013). In the event of an otherwise irreconcilable conflict, however, the present specification shall control.

What is claimed:

1. An apparatus that is adapted for degassing a liquid that initially contains both entrained gas bubbles and suspended solid particles, prior to transporting the de-gassed liquid to a sedimentation tank that is adapted to remove suspended solid particles from the liquid;

wherein:

said apparatus comprises a degassing chamber, one or more stand pipes, a feed trough, and a plurality of feed wells; wherein said feed trough has an annular shape;

and wherein:

(a) (i) said degassing chamber comprises one or more inlets for receiving a pressurized, superheated liquid that initially contains both entrained gas bubbles and suspended solid particles; (ii) said degassing chamber comprises one or more outlets for transporting de-gassed liquid to said feed trough; (iii) the shape and dimensions of said degassing chamber adapt the degassing chamber to be positioned immediately above the sedimentation tank or within the sedimentation tank, such that, when the degassing chamber and the sedimentation tank are both in operation, the level of liquid in the degassing chamber is from about 0 cm to about 65 cm above the level of liquid in the sedimentation tank; (iv) the ratio of surface area to volume within said degassing chamber is between about 1.5 meter$^{-1}$ and about 10.0 meter$^{-1}$; (v) said degassing chamber is adapted to allow the pressurized, superheated liquid to boil rapidly by reducing its pressure to about 1 atmosphere, whereby the rapid boiling causes most of the entrained gas bubbles to escape from the liquid;

TABLE 1

Comparison between two clarifiers with and without flash trough both of them equipped with TRD technology.

| | % Turbidity Reduction | | % Color Reduction | |
|---|---|---|---|---|
| Sample | Type B Flash Tank, with TRD, but without Novel Flash Trough | Prototype Embodiment, with TRD, and with Novel Flash Trough | Type B Flash Tank, with TRD, but without Novel Flash Trough | Prototype Embodiment, with TRD, and with Novel Flash Trough |
| 1 | 93.77 | 94.36 | 27.39 | 25.65 |
| 2 | 93.31 | 93.54 | 29.12 | 27.69 |
| 3 | 93.04 | 93.59 | 27.12 | 26.03 |
| 4 | 92.83 | 93.37 | 31.18 | 29.18 |
| 5 | 92.22 | 92.55 | 28.82 | 28.95 |
| 6 | 91.16 | 92.08 | 26.72 | 25.55 |
| 7 | 90.04 | 90.54 | 27.84 | 25.60 |
| AVERAGE | 92.47 | 92.99 | 28.49 | 27.17 |

(b) said one or more stand pipes are affixed to the top of said degassing chamber; each of said stand pipes is open to the interior of said degassing chamber, and each of said stand pipes is also directly or indirectly open to the atmosphere; and the height and diameter of said stand pipes are adapted to allow escaping gases from said degassing chamber to be vented to the atmosphere, without allowing liquid to escape from said apparatus;

(c) said feed trough is adapted to receive de-gassed liquid from said degassing chamber via said one or more outlets, and to deliver de-gassed liquid to said feed wells; wherein the positioning of said one or more outlets, the positioning of said feed wells, and the shape and dimensions of said feed trough are all sufficiently symmetric that, in operation, the flow of de-gassed liquid to each of said feed wells is equal or nearly equal, such that any imbalance in the flow rates to said feed wells is insufficient to induce turbulence in the liquid in the sedimentation tank; and (d) said feed wells are adapted to receive de-gassed liquid from said feed trough, and to deliver degassed liquid into the sedimentation tank at a level that is below the operational surface level of liquid in the sedimentation tank.

2. The apparatus of claim 1, wherein said degassing chamber has an annular shape.

3. The apparatus of claim 1, wherein said apparatus comprises two or more of said stand pipes, and wherein the tops of said stand pipes are connected to one another to equilibrate the pressures at each of said stand pipes.

4. The apparatus of claim 1, wherein the lower end of each of said feed wells comprises a turbulence reduction device to reduce turbulence induced in the liquid in the sedimentation tank caused by the liquid delivered by said feed wells into the sedimentation tank.

5. The apparatus of claim 4, wherein each said turbulence reduction device comprises:

(a) first and second rigid plates, wherein said first and second plates are about the same size and shape, except that said first plate incorporates a central hole through which one of said feed wells may pass, so that said feed well is positioned to discharge liquid into the space between said first and second plates;

(b) one or more spacers, wherein each said spacer is attached both to said first plate and to said second plate, wherein said spacers hold said first and second plates in a fixed position relative to one another and parallel to one another;

(c) at least four baffles rigidly affixed to said second plate; wherein said baffles are positioned symmetrically relative to the axis that passes through the center of the hole in said first plate and that is also perpendicular to both said plates; and wherein spaces are present between adjacent baffles to allow some liquid to pass between adjacent baffles;

wherein said turbulence reduction device is adapted for use as follows:

(d) when liquid exits said feed well, the liquid impinges upon said second plate; said second plate diverts the flow of the liquid by about 90 degrees, from an approximately linear flow that is approximately parallel to the axis, into a radially outward flow that is approximately parallel to said second plate; and then, when the radially-outwardly-flowing liquid impinges upon said baffles, said baffles further disperse the energy of the flow of the liquid; so that, when the liquid exits the space between said first and second plates, there is essentially no turbulence in the liquid, and there is essentially no turbulence at the interface between the exiting liquid and the liquid already present in the sedimentation tank; and wherein the spaces between adjacent baffles inhibit the formation of any vortices that would otherwise tend to form within a hypothetical, otherwise-identical apparatus in which said adjacent baffles were contiguous to one another, without spaces between adjacent baffles.

6. A combination comprising the apparatus of claim 5 and a sedimentation tank, wherein said apparatus is affixed to the top of said sedimentation tank or within said sedimentation tank; and wherein said sedimentation tank that is adapted to remove suspended solid particles from the degassed liquid.

7. An apparatus that is adapted for degassing a liquid that initially contains both entrained gas bubbles and suspended solid particles, prior to transporting the de-gassed liquid to a sedimentation tank that is adapted to remove suspended solid particles from the liquid;

wherein:

said apparatus comprises a degassing chamber, one or more stand pipes, a feed trough, and a plurality of feed wells; wherein said feed trough has an annular shape;

and wherein:

(a) (i) said degassing chamber comprises one or more inlets for receiving a liquid that initially contains both entrained gas bubbles and suspended solid particles; (ii) said degassing chamber comprises one or more outlets for transporting de-gassed liquid to said feed trough; (iii) the shape and dimensions of said degassing chamber adapt the degassing chamber to be positioned immediately above the sedimentation tank or within the sedimentation tank, such that, when the degassing chamber and the sedimentation tank are both in operation, the level of liquid in the degassing chamber is from about 0 cm to about 65 cm above the level of liquid in the sedimentation tank; (iv) the ratio of surface area to volume within said degassing chamber is between about 1.5 meter$^{-1}$ and about 10.0 meter$^{-1}$; (v) said degassing chamber is adapted to allow entrained gas bubbles to escape from the liquid;

(b) said one or more stand pipes are affixed to the top of said degassing chamber; each of said stand pipes is open to the interior of said degassing chamber, and each of said stand pipes is also directly or indirectly open to the atmosphere; and the height and diameter of said stand pipes are adapted to allow escaping gases from said degassing chamber to be vented to the atmosphere, without allowing liquid to escape from said apparatus;

(c) said feed trough is adapted to receive de-gassed liquid from said degassing chamber via said one or more outlets, and to deliver de-gassed liquid to said feed wells; wherein the positioning of said one or more outlets, the positioning of said feed wells, and the shape and dimensions of said feed trough are all sufficiently symmetric that, in operation, the flow of de-gassed liquid to each of said feed wells is equal or nearly equal, such that any imbalance in the flow rates to said feed wells is insufficient to induce turbulence in the liquid in the sedimentation tank; and (d) said feed wells are adapted to receive de-gassed liquid from said feed trough, and to deliver degassed liquid into the sedimentation tank at a level that is below the operational surface level of liquid in the sedimentation tank.

8. The apparatus of claim 7, wherein said degassing chamber has an annular shape.

9. The apparatus of claim 7, wherein said apparatus comprises two or more of said stand pipes, and wherein the tops of said stand pipes are connected to one another to equilibrate the pressures at each of said stand pipes.

10. The apparatus of claim 7, wherein the lower end of each of said feed wells comprises a turbulence reduction device to reduce turbulence induced in the liquid in the sedimentation tank caused by the liquid delivered by said feed wells into the sedimentation tank.

11. The apparatus of claim 10, wherein each said turbulence reduction device comprises:
 (a) first and second rigid plates, wherein said first and second plates are about the same size and shape, except that said first plate incorporates a central hole through which one of said feed wells may pass, so that said feed well is positioned to discharge liquid into the space between said first and second plates;
 (b) one or more spacers, wherein each said spacer is attached both to said first plate and to said second plate, wherein said spacers hold said first and second plates in a fixed position relative to one another and parallel to one another;
 (c) at least four baffles rigidly affixed to said second plate; wherein said baffles are positioned symmetrically relative to the axis that passes through the center of the hole in said first plate and that is also perpendicular to both said plates; and wherein spaces are present between adjacent baffles to allow some liquid to pass between adjacent baffles;

wherein said turbulence reduction device is adapted for use as follows:
 (d) when liquid exits said feed well, the liquid impinges upon said second plate; said second plate diverts the flow of the liquid by about 90 degrees, from an approximately linear flow that is approximately parallel to the axis, into a radially outward flow that is approximately parallel to said second plate; and then, when the radially-outwardly-flowing liquid impinges upon said baffles, said baffles further disperse the energy of the flow of the liquid; so that, when the liquid exits the space between said first and second plates, there is essentially no turbulence in the liquid, and there is essentially no turbulence at the interface between the exiting liquid and the liquid already present in the sedimentation tank; and wherein the spaces between adjacent baffles inhibit the formation of any vortices that would otherwise tend to form within a hypothetical, otherwise-identical apparatus in which said adjacent baffles were contiguous to one another, without spaces between adjacent baffles.

12. A combination comprising the apparatus of claim 11 and a sedimentation tank, wherein said apparatus is affixed to the top of said sedimentation tank or within said sedimentation tank; and wherein said sedimentation tank that is adapted to remove suspended solid particles from the degassed liquid.

* * * * *